Oct. 12, 1926.

T. E. PRAY 1,602,932

MINING MACHINE

Filed April 6, 1922    5 Sheets-Sheet 2

Oct. 12, 1926.

T. E. PRAY

1,602,932

MINING MACHINE

Filed April 6, 1922    5 Sheets-Sheet 3

Inventor
Thomas E. Pray
By: Clarence F. Poole
Atty.

Oct. 12, 1926.

T. E. PRAY

MINING MACHINE

Filed April 6, 1922     5 Sheets-Sheet 5

Inventor:
Thomas E. Pray
By: Clarence F. Poole
Atty.

Patented Oct. 12, 1926.

1,602,932

UNITED STATES PATENT OFFICE.

THOMAS E. PRAY, OF CHICAGO, ILLINOIS, ASSIGNOR TO GOODMAN MANUFACTURING COMPANY, OF CHICAGO, ILLINOIS, A CORPORATION OF ILLINOIS.

MINING MACHINE.

Application filed April 6, 1922. Serial No. 550,192.

This invention relates to improvements in kerf cutting mining machines and has for its principal object to provide a new and improved device of this description, capable of being easily and quickly handled during its cutting operation and during its movement from place to place.

In carrying out my invention, I provide a kerf cutting element, including a driving motor, which is permanently supported on a wheeled truck, preferably for movement on the mine track. The cutting element is pivotally connected near its rear end to the truck and is provided with a laterally telescoping plate interposed between it and the truck and adapted to co-operate with supporting jacks, whereby said cutting element may be supported to swing angularly on both sides of said truck to cut a kerf in advance of the machine, and is further arranged so that the cutting element and support may be raised into various elevations with respect to the truck body so as to cut at various heights. The apparatus is further arranged so that the cutting mechanism may be lowered to require a minimum overall height of the apparatus while being moved from place to place in the mine, and while being so moved, the driving motor carried by the cutting element has operative connection with the truck wheels to drive the apparatus under its own power. An improved toggle mechanism for raising and lowering the cutting mechanism is also provided as will hereinafter be more fully set forth. Other features and objects of my invention will appear from time to time as the description proceeds.

The invention consists in the combination, construction and arrangement of parts as will hereinafter be described in connection with the accompanying drawings, and more particularly defined in the appended claims.

In the form in which my invention is embodied as illustrated in the drawings, a cutting element 10 is mounted on a truck frame 11 having wheels 12, 12, preferably for engagement with tracks 13, 13. The cutting element may be of any suitable construction including a kerf cutting device, draft device, and a motor for operating these devices. In the form illustrated, I prefer to use for the cutting element a shortwall mining machine of a well-known type ordinarily adapted for movement on the mine floor and having a forwardly projecting cutter arm 14 provided with a cutter chain 15 and with a suitable winding drum 16 (see Figs. 10 to 13) having a draft cable 17 wound thereon to move the machine angularly as will hereinafter more fully appear. A motor having suitable operative connection with the cutter chain 15 and the winding drum 16 is mounted in a casing 18 at the rear end of the cutting element 10. Details of the motor and operative connections need not be described as they form no part of the present invention when machines of this type are used upon the mine floor certain connecting devices hereinafter to be described are dispensed with and the machine slides upon its bottom face 19 on the mine floor.

Figures 1, 2, 9:
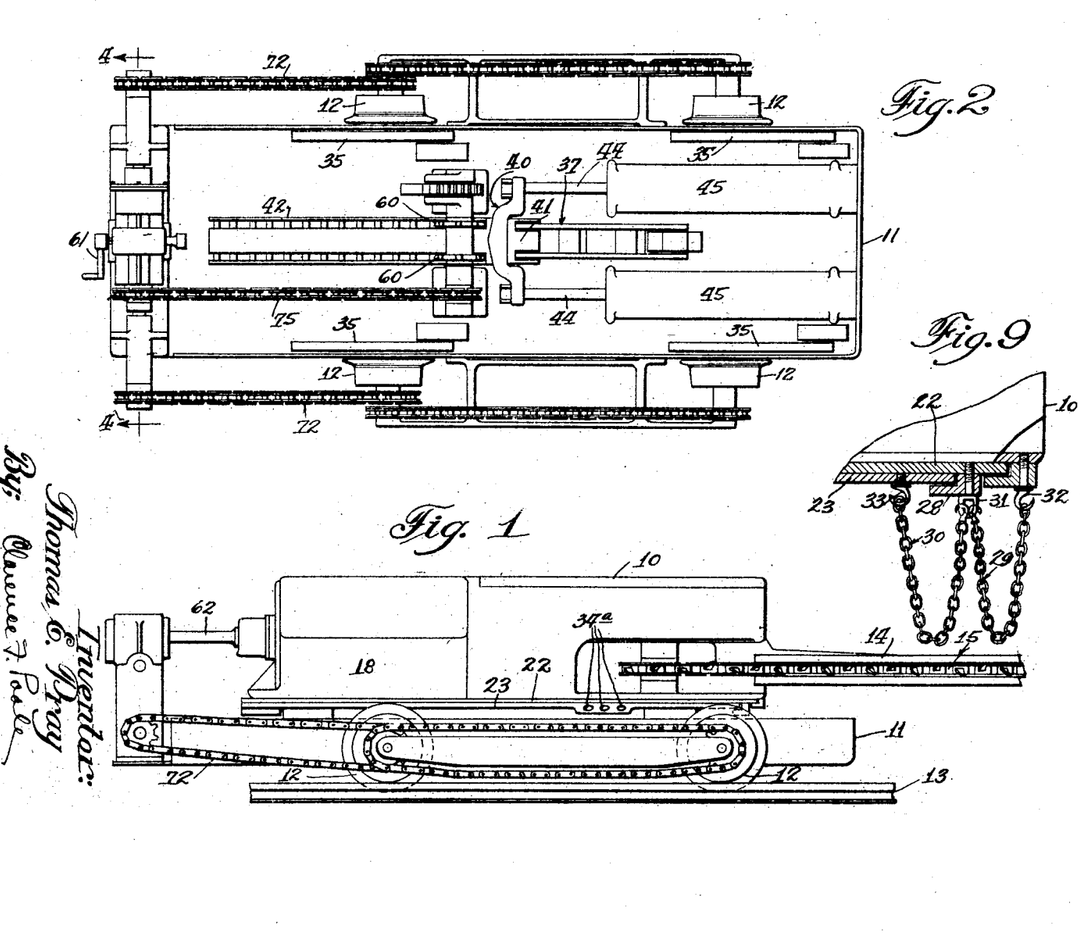
Figure 1 is a side elevation of a machine embodying my invention, with the outer end of the cutter arm omitted.
Fig. 2 is a plan view of the machine with the cutting element and supporting plates removed to show the operating mechanism of the elevating device.
Fig. 9 is a detail.
Figures 3, 7, 8:
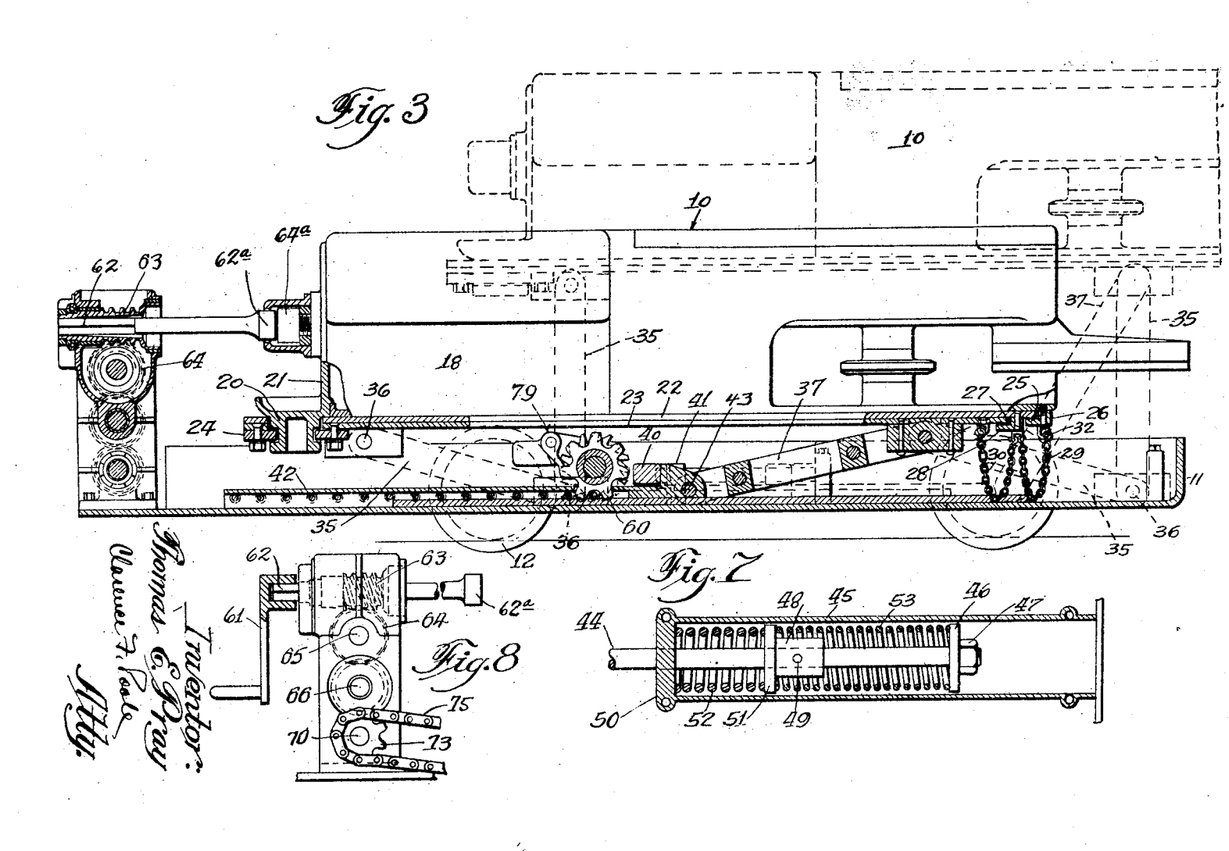
Fig. 3 is a side view drawn to a larger scale than Fig. 1 showing the truck and elevating mechanism in longitudinal section. This view also indicates in dotted lines the position of the cutting element when raised.
Fig. 7 is a detail of the tension means forming a portion of the elevating device.
Fig. 8 is a detail of the manually operated mechanism for operating the elevating device.
Figure 10:
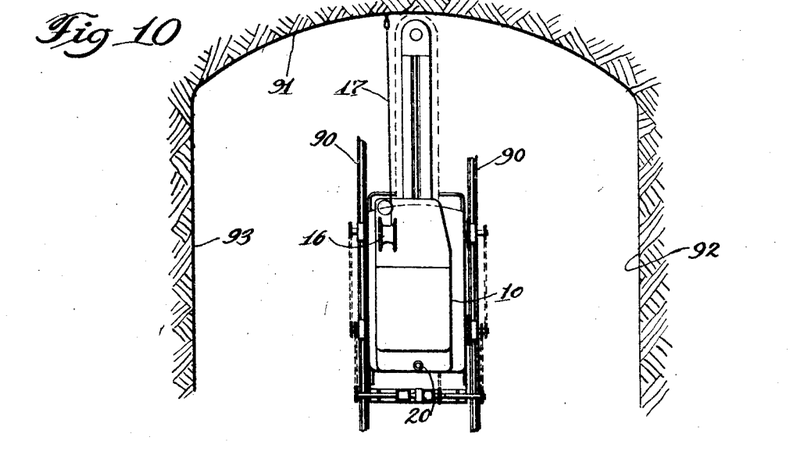
Figs. 10, 11, 12 and 13 are diagrammatic views illustrating the operation of the machine in a mine.
Figure 11:
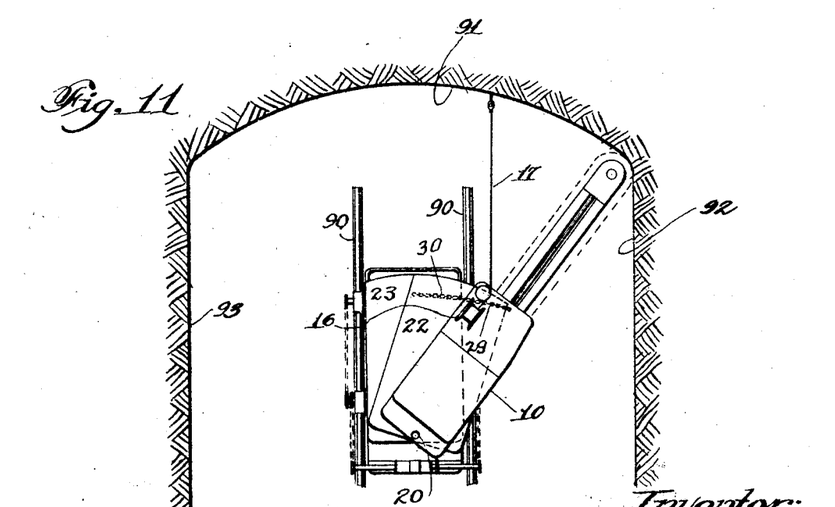
Figure 12:
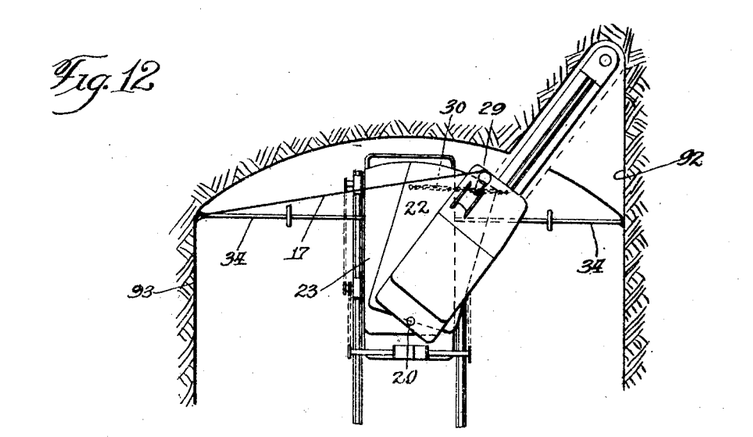
Figure 13:
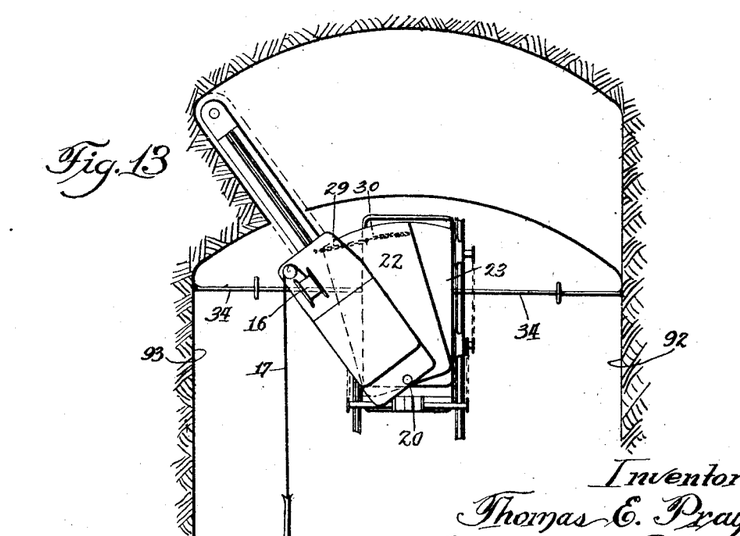

In the present invention the cutting element is carried at all times on the truck. While the machine is being transported from place to place, the cutting element is arranged longitudinally of the truck body as shown in Figs. 1, 3 and 10, but when cutting a kerf the cutting element is swung angularly about a fixed pivot on the truck frame as indicated in Figs 11, 12 and 13. Details of construction whereby this pivotal movement may be accomplished is shown in Fig. 3, in which it will be seen that a pivotal stud 20 is carried at the rear end of the cutting element and preferably integral with the end plate 21 of the motor casing 18. The cutting element rests on a plate 22 which plate in turn rests on a bed plate 23 forming the top portion of the elevating device which will hereinafter be described. It will be noted that the stud 20 extends through the plate 22 and provides bearing to permit angular movement thereof in a substantially horizontal plane. Said stud also has bearing in an annular plate 24 forming a part of the bed plate 23. The arrangement is such that the cutting element may be pivotally moved on stud 20 with respect to the plate 22 and with the bed plate 23. The plate 22 may also be pivoted on the common axis of the stud 20 with respect to the cutting element and the bed plate 23. The forward edge 25 of the plate 22 is preferably curved and is retained in a guide member 26 attached to the forward end of the cutting element. The forward edge 27 of the bed plate 23 is similarly curved and retained in a guide member 28 attached to the plate 22. Suitable means for limiting the lateral swinging movement of the cutting element and plate 22 with respect to the bed plate 23 is provided, as for instance a pair of chains 29 and 30. The ends of chain 29 are connected on hooks 31, 32, at the forward end of the cutting element 10 and the plate 22, respectively. The ends of chain 30 connect hook 32 on plate 22 with another hook 33 on the bed plate 23. The length of the chains may be readily adjusted by engaging any one of the links with the hooks as desired, so as to permit any desired angular movement of the cutting element with respect to the truck to cut a predetermined width of room or entry.

Under certain conditions as will hereinafter be described, it is desirable to arrange jacks 34, 34, on opposite sides of the machine as it is cutting a kerf across the face as shown in Figs. 12 and 13. These jacks may be of the ordinary screw type used in mining operations and are set with their outer ends engaging the side walls of the mine room and their inner ends engaging the sides of the bed plate 23, as for instance, in suitable indentations 34ª, 34ª, formed along the lateral margins of said bed plate as shown in Fig. 1.

The elevating mechanism includes a toggle device having as its principal elements a plurality of toggle members 35, 35, pivotally connecting the bed plate 23 and the truck frame 11 at points 36, 36, adjacent the front and rear of the machine respectively, and a longitudinally movable toggle member 37 adapted to co-act with the toggle members 35, 35, to raise the bed plate and cutting element as indicated in dotted lines in Fig. 3. This general arrangement of toggle members is similar to that disclosed in my co-pending application for U. S. Letters Patent, bearing Serial No. 489,763, filed Aug. 4, 1921.

In the present construction, I provide an improved arrangement of tension means coacting with the toggle mechanism and arranged to be placed under tension by the weight of the cutting mechanism as it approaches its lowermost position and to assist in the raising of the mechanism from its lowermost position when the toggle members are at the maximum angle with respect to each other and require the greatest amount of power to be operated. This tension device is shown in detail in Figs. 2 and 7 and comprises a yoke 40 engaging a movable head 41 of a longitudinally movable rack 42 which is pivotally connected at 43 to the toggle member 37. Means for actuating this rack will be hereafter described. A pair of rods 44 are connected to the ends of the yoke 40 and extend into cylinders 45, 45, mounted on the truck member 11. A detail of one of these cylinders is shown in Fig. 7, in which it will be seen that the rod 44 is provided at its inner extremity with a collar 46 secured by suitable means such as a bolt 47. A smaller collar 48 is fixed on the rod by suitable means such as a pin 49 at a point intermediate the collar 46 and the bearing shoulder 50 at the end of the cylinder through which the rod 44 extends. A collar 51 larger than collar 48 is loosely mounted on the rod 44. A compression spring 52 is interposed between the collar 51 and the shoulder 50 of the cylinder. A compression spring 53 relatively lighter and more resilient than the spring 52 is interposed between collar 46 and collar 51.

In Fig. 7 the rod 44 is shown in the same position as in Figs. 1 and 3, with the elevating mechanism in its lowest position, in which position springs 52 and 53 are under maximum compression and the movable collar 51 is in engagement with the fixed collar 48. The spring 52 exerts its pressure directly on rod 44 through collars 51 and 48, said spring being of sufficient strength and stiffness to maintain spring 53 under full compression. In the initial movement of the elevating mechanism, therefore, the full tension of spring 52 is exerted to assist in the upward movement thereof, until the point is reached where the tension of said said spring is partially spent, and becomes equal to the tension of spring 53, at which point, both springs become operative and begin to expand simultaneously, causing collar 51 to move slowly away from fixed collar 49.

During the downward movement of the mechanism, the action of the springs is manifestly the reverse of that above described, that is to say, both springs are compressed simultaneously at first, but spring 53, being the lighter, is compressed more rapidly than spring 52, and collar 51 is brought into engagement with collar 49 before the end of the stroke is reached, so that the final downward thrust of the toggle mechanism is taken up entirely by the heavier spring 52. By means of the arrangement of springs just described, a maximum tension is provided where it is most needed, at the beginning of the stroke. Springs of varying tensions may be provided to suit requirements as to weight of the cutting mechanism and power available to lift the same. Two, three, or more sets of springs of various sizes and tensions may be provided and the stroke of the springs may be of any length desired. For most purposes, however, it is only necessary to assist the action of the toggle mechanism through a small portion of its upward movement. In the form herein illustrated, it will be seen in Figs. 2 and 3 that endwise movement of yoke 40 is limited by the cylinders 45, 45, whereas the head 41 of rack member 42 continues its forward movement considerably beyond this point, as shown in dotted lines in Fig. 3. The yoke 40 remains in position to be engaged by the head 41 when the mechanism is again lowered.

Figure 4:
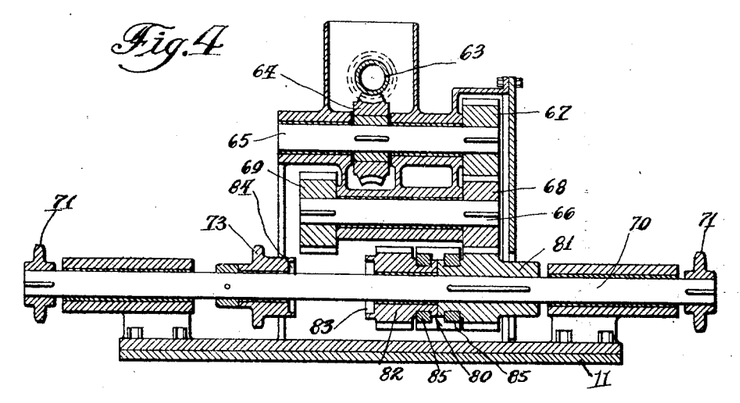
Fig. 4 is a vertical cross-section taken on line 4—4 of Fig. 2 of the driving mechanism on the rear end of the truck.
Figure 5:
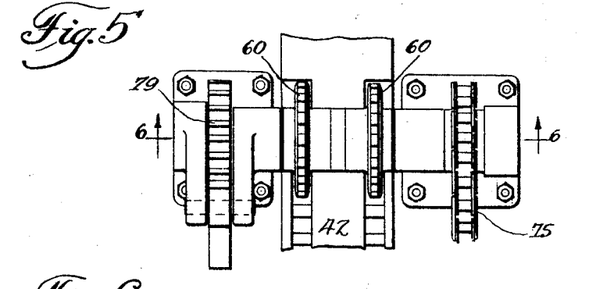
Fig. 5 is a detail plan view of a portion of the elevating device.
Figure 6:
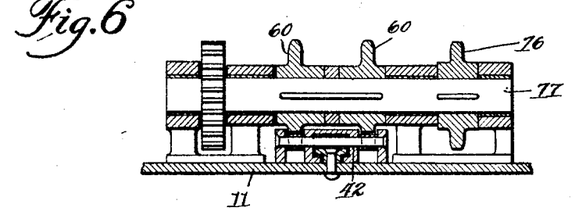
Fig. 6 is a cross-section taken on line 6—6 of Fig. 5.

The mechanism for controlling and actuating the elevating device is shown in detail in Figs. 2, 4, 5, 6 and 8, and includes a pair of pinions 60, 60, engaging the rack member 42, and operatively connected to a crank 61 at the rear end of the truck body 11. This crank is adapted to fit on a squared pin 62. This pin also forms, when coupled at its forward end 62ª with the motor shaft 64ª, a driving connection between the motor and the truck for propelling the latter. In the arrangement illustrated, the machine is propelled only when the cutting element is in its lowest position, and the elevating mechanism is inoperative. Furthermore, it is desirable to operate the elevating mechanism only when the driving connection between the cutting mechanism and truck is disengaged. Consequently, the handle 61 may be operated through the same gearing which is used to propel the truck, so that the elevating mechanism may be actuated without interfering with the driving mechanism. Details of the elevating and driving mechanism is shown in Fig. 4. The squared pin 62 fits through and drives worm 63 which is mounted to turn on a longitudinal axis. Worm 63 is meshed with worm gear 64 on shaft 65 mounted on a transverse axis. A second shaft 66 is mounted parallel with shaft 65 and is driven therefrom through gears 67 and 68. A second gear 69 is carried on the end of shaft 66 opposite gear 68. A transverse driving shaft 70 is mounted adjacent shaft 66, and is provided with chain sprockets 71, 71, keyed on opposite ends thereof and having driving connection with the truck wheels 12, 12, through chains 72, 72. A chain sprocket 73 is loosely mounted on the shaft 70, and has driving connection with the pinions 60, 60, of the elevating mechanism through a chain 75, chain sprocket 76 and shaft 77.

A shifting clutch member 80 is mounted on the shaft 70, and comprises a pinion 81, feathered on said shaft, and a second pinion 82, loosely mounted adjacent said last-named pinion, and provided with clutch jaws 83 adapted to engage clutch jaws 84 carried by sprocket 73. The pinions 81 and 82 are preferably shifted as a unit, by collars 85, 85, suitably connected together, and operable to move the pinions longitudinally along the shaft 70. In the position shown in Fig. 4, pinion 81 is in engagement with gear 68 and the pinion 82 is removed from gear 69 and sprocket 73. In this position, shaft 70 has driving connection with worm 63, and when pin 62 is coupled with the motor shaft 64, the truck may be propelled through chain sprockets 71, 71, and chains 72, 72. When the clutch member 80 is shifted to the left, pinion 81 is disengaged from gear 68 and the clutch member is in neutral position. Further movement of the clutch member causes pinion 82 to mesh with gear 69, and finally become engaged with chain sprocket 73 through clutch jaws 83 and 84. In this position, the handle 61 may be utilized to raise or lower the elevating mechanism through chain 75 and pinions 60, 60, which operate the rack 42 of the toggle mechanism already described. The worm 63 and gear 64 are of the self-locking type, so that the elevating mechanism may be maintained in any desired position while operating the same. A ratchet device 79 of any suitable construction is also associated with the shaft 77 to maintain the elevating mechanism in any desired position, particularly when the operating gearing above described is disconnected.

From the above description it will be seen that a machine constructed in accordance with my invention is particularly adapted for use in advancing entries or relatively narrow rooms under conditions where it is practicable or desirable to cut a kerf above the floor level. As far as the general features of my invention are concerned, any type of cutting mechanism may be employed, but one of the particular advantages of the specific embodiment of my invention illustrated herein is that whereby a standard mining machine of the shortwall type is utilized as a cutting element and mounted at all times on the truck. By providing the pivotal connection on the standard mining machine near the rear end thereof, it is manifest that quite a wide room may be cut with the cutting element mounted in this manner.

A typical method of handling and operating the apparatus is illustrated in the diagrams in Figs. 10 to 13, inclusive, in which it will be seen that the apparatus is moved on the mine track up to or adjacent the end wall or working face 91 of the mine room. During the transportation of the apparatus from place to place, it is desirable that the elevating mechanism be in its lowest position so as to provide maximum clearance for the machine, especially when moving under low roof in the mine. The apparatus is propelled by its own power, the armature shaft 64 of the driving motor being coupled with pin 62 and the associated propelling mechanism on the truck body already described for this purpose.

To prepare the apparatus for cutting, the coupling pin 62 is disengaged from the motor so that the cutting element is free to swing on its pivot 20. The cutting element is then adjusted at the desired height at which the kerf is to be cut by operating the elevating mechanism in the manner hereinbefore described, that is to say, by means of the handle 61. An alternative method for raising the cutting mechanism by means of the draft rope 17 is disclosed in my co-pending application bearing Serial No. 489,763, and consists in anchoring the free end of the cable 17 at or adjacent the working face 91 in advance of the apparatus, as shown in Fig. 10. The truck is restrained from forward movement on the track by suitable means, and the cable 17 is then found on the drum 16 causing the elevating mechanism to swing upwardly and forwardly to the desired level, as shown in Fig. 10. The cutting mechanism is then ready to cut and is pivotally moved into a position as shown in Fig. 11 with the end of the cutter arm at one corner of the room as for instance, the right-hand corner. The cable 17 is then anchored at the working face 91 in advance of the cutting element as shown in this figure, and the machine is sumped by moving the entire apparatus longitudinally along the track with the outer end of the cutter bar following substantially along the line of the side wall 92 of the room, until the machine reaches the position shown in Fig. 12. The machine is then ready to cut an arcuate kerf across the working face, and for this purpose the draft rope 17 is anchored at some point toward the left side of the room or entry, as for instance, at the outer extremity of a jack 34 which is arranged horizontally between the left-hand wall 93 and the left margin of the bed plate 23. The cable may be anchored in any other suitable position, however, as conditions require. Before starting the cut, it may be desirable to set jacks 34, 34, on both sides of the machine and so arranged as to be in longitudinal alignment with, and form a support for, the supporting plate 22 and the cutting mechanism when the latter is moved beyond the side margins of the bed plate 23 as shown in Figs. 12 and 13. With the jacks arranged as shown, the apparatus is rigidly supported during the cutting operation and auxiliary support is given the cutting mechanism when the forward portion thereof swings beyond the side margins of the truck frame. When the cutting element reaches the position substantially as shown in Fig. 13 with the end of the cutter arm in alignment with the left side wall 93, the draft rope 17 is anchored to the rear of the mechanism. The apparatus is then moved rearwardly along the mine track so as to finish the cut along the left wall 93. The cutting element is then returned to its initial position with the elevating mechanism lowered, for removal from the room in the usual manner.

The width of the cut may be limited and adjusted by means of the chains 29 and 30 or an equivalent device, which limits the swinging movement of the cutting element with respect to the truck. When relatively narrow entries or rooms are being cut, the use of the jacks 34, 34, may be dispensed with.

Although I have shown and described one form in which my invention may be embodied, it will be understood that many other means may be employed for accomplishing the same results, without departing from the spirit and scope of my invention, I do not therefore wish to be understood as limiting myself to the specific construction illustrated herein excepting as specifically limited in the appended claims.

I claim as my invention:—

1. In a mining apparatus, the combination of a wheeled truck, a cutting element mounted for horizontal pivotal movement on said truck, and auxiliary supporting means adapted to be fixed against lateral abutments and engage said truck on opposite sides thereof in position to support the cutting element when the latter swings beyond the margins of the truck.

2. In a mining apparatus, the combination of a wheeled truck, a cutting element pivotally mounted on said truck, and supporting means pivotally mounted concentric with said cutting element and interposed between the latter and said truck, said supporting means adapted to swing laterally beyond the margins of said truck to afford support for said cutting element.

3. In a mining apparatus, the combination of a wheeled truck, a cutting element pivotally mounted on said truck, supporting means pivotally mounted concentric with said cutting element and interposed between the latter and said truck, said supporting means adapted to swing laterally beyond the margins of said truck to afford support for said cutting element, and means limiting the angular movement of said supporting means and said cutting element respective to each other and to the the truck.

4. In a mining apparatus, the combination of a wheeled truck, a cutting element pivotally mounted on said truck, supporting means pivotally mounted concentric with said cutting element and interposed between the latter and said truck, said supporting means adapted to swing laterally beyond the margins of said truck to afford support for said cutting element in predetermined positions of the latter, and adjustable means limiting the angular movement of said supporting means and said cutting element respective to each other and to the truck, whereby the cutting element may be limited to swing in a predetermined arc.

5. In a mining apparatus, the combination of a wheeled truck, a cutting element pivotally mounted on said truck, supporting means pivotally mounted concentric with said cutting element and interposed between the latter and said truck, said supporting means adapted to swing laterally beyond the margins of said truck to afford support for said cutting element, and auxiliary supporting means adapted to be fixed against lateral abutments and detachably connected to the truck body in position to provide vertical support for said supporting member when the latter is swung laterally beyond the boundary of the truck body.

6. In a mining apparatus, the combination of a wheeled truck, a cutting element pivotally mounted on said truck, supporting means pivotally mounted concentric with said cutting element and interposed between the latter and said truck, said supporting means adapted to swing laterally beyond the margins of said truck to afford support for said cutting element, adjustable means limiting the angular movement of said supporting means and said cutting element respective to each other and to the truck, whereby the cutting element may be limited to cut a predetermined width of room or entry, and auxiliary supporting means adapted to be fixed against lateral abutments and detachably connected to the truck body in position to provide vertical support for said supporting member when the latter is swung laterally beyond the boundary of the truck body.

7. In a mining apparatus, the combination of a wheeled truck, a cutting element provided with cutting devices extending longitudinally and forwardly of said truck and having a pivotal support on said truck, and mechanism for moving said cutting element and support respective to said truck into raised position nearer the front end of said truck than in its lowered position, said elevating means including a pair of longitudinally spaced links pivotally connected between said truck and said cutting element.

8. In a mining apparatus, the combination of a wheeled truck, a cutting element provided with cutting devices extending longitudinally and forwardly of said truck and having a pivotal support on said truck, mechanism for moving said cutting element and support respective to said truck into raised position nearer the front end of said truck than in its lowered position, said elevating means including a pair of longitudinally spaced links pivotally connected between said truck and said cutting element, and draft means on said cutting element adapted to cooperate with said elevating mechanism to raise the same.

9. In a mining apparatus, the combination of a wheeled truck provided with propelling mechanism, a cutting element provided with a motor and cutting devices extending longitudinally and forwardly of said truck and having a pivotal support on said truck, mechanism for moving said cutting element and support respective to said truck into raised position nearer the front end of said truck than in its lowered position, said elevating means including a pair of longitudinally spaced links pivotally connected between said truck and said cutting element, and means affording operative connection between the motor and the propelling mechanism on said truck in the lowered position of the cutting element.

10. In a mining apparatus, the combination of a wheeled truck and a cutting element mounted in cutting position thereon, said cutting element comprising a mining machine having a supporting shoe and provided with a motor, kerf cutting mechanism and draft mechanism each having operative connection with said motor, said cutting element being pivotally connected adjacent its rear end and the rear end of said truck with the rear end of said truck by said supporting shoe and in sliding engagement with the forward portion of said truck, and propelling mechanism on said wheeled truck adapted to have detachable operative connection with said motor in one position of said cutting mechanism.

11. In a mining apparatus, the combination of a wheeled truck and a cutting element, comprising a mining machine having a supporting shoe and provided with a motor, kerf cutting mechanism and draft mechanism each having operative connection with said motor, said cutting element being pivotally connected adjacent the rear end of said truck for horizontal movement thereon, and auxiliary supporting means adapted to be fixed against lateral abutments and engage said truck on opposite sides thereof in position to support the cutting element when the latter swings beyond the margins of the truck.

12. In a mining apparatus, the combination of a wheeled truck and a cutting element, comprising a mining machine having a supporting shoe and provided with a motor, kerf cutting mechanism and draft mechanism each having operative connection with said motor, an elevating support interposed between said cutting element and the body of said truck, said cutting element being pivotally connected adjacent the rear end of said support for horizontal movement thereon, and extensible means interposed between said cutting mechanism and said elevating support and movable with said cutting mechanism to provide support for the latter when it is swung beyond the lateral margins of said elevating support.

Signed at Chicago, in the county of Cook and State of Illinois, this 3rd day of April, 1922.

THOMAS E. PRAY.